United States Patent
Beier et al.

(10) Patent No.: US 11,915,273 B2
(45) Date of Patent: Feb. 27, 2024

(54) SYSTEMS FOR CREATING AND/OR MAINTAINING DATABASES AND A SYSTEM FOR FACILITATING ONLINE ADVERTISING WITH IMPROVED PRIVACY

(71) Applicant: relemind GmbH, Berlin (DE)

(72) Inventors: Heiko Beier, Munich (DE); Christoph Schmidt, Munich (DE)

(73) Assignee: relemind GmbH, Berlin (DE)

( * ) Notice: Subject to any disclaimer, the term of this patent is extended or adjusted under 35 U.S.C. 154(b) by 275 days.

(21) Appl. No.: 17/345,209

(22) Filed: Jun. 11, 2021

(65) Prior Publication Data
US 2021/0304260 A1  Sep. 30, 2021

Related U.S. Application Data

(62) Division of application No. 16/422,151, filed on May 24, 2019, now abandoned.

(51) Int. Cl.
*G06F 7/00* (2006.01)
*G06F 16/31* (2019.01)
(Continued)

(52) U.S. Cl.
CPC ....... *G06Q 30/0277* (2013.01); *G06F 16/313* (2019.01); *G06F 16/353* (2019.01);
(Continued)

(58) Field of Classification Search
CPC . G06Q 30/0277; G06F 16/353; G06F 16/313; G06F 40/284; G06F 40/268;
(Continued)

(56) References Cited

U.S. PATENT DOCUMENTS

2009/0024554 A1  1/2009  Murdock et al.
2009/0327346 A1  12/2009  Teinila et al.
(Continued)

FOREIGN PATENT DOCUMENTS

| CN | 103853824 | 6/2014 |
|---|---|---|
| WO | 2014/150458 | 9/2014 |

OTHER PUBLICATIONS

Teng-Kai Fan, "Sentiment-Oriented Contextual Advertising", Department of Computer Science, Accepted May 9, 2009.
(Continued)

*Primary Examiner* — Isaac M Woo
(74) *Attorney, Agent, or Firm* — Dicke, Billig & Czaja, PLLC

(57) ABSTRACT

A system for creating and/or maintaining a database is disclosed. In one example, the system includes one or more processors; a classification module configured to determine primary weights for primary data streams, each primary weight referring to a correlation between one of the primary data streams and one segment category of several predefined segment categories; a recognition module configured to identify explicit concepts and implicit concepts in the primary data streams, and to determine first secondary weights characterizing embeddings of the identified concepts; an expansion module configured to determine for the identified concepts respective related concepts; and a storage module configured to save the identified concepts.

17 Claims, 7 Drawing Sheets

(51) Int. Cl.
*G06F 16/35* (2019.01)
*G06F 40/268* (2020.01)
*G06F 40/284* (2020.01)
*G06F 40/295* (2020.01)
*G06F 40/30* (2020.01)
*G06N 3/08* (2023.01)
*G06N 5/046* (2023.01)
*G06N 20/00* (2019.01)
*G06Q 30/0241* (2023.01)

(52) U.S. Cl.
CPC .......... *G06F 40/268* (2020.01); *G06F 40/284* (2020.01); *G06F 40/295* (2020.01); *G06F 40/30* (2020.01); *G06N 3/08* (2013.01); *G06N 5/046* (2013.01); *G06N 20/00* (2019.01)

(58) Field of Classification Search
CPC ....... G06F 40/295; G06F 40/30; G06N 20/00; G06N 3/08; G06N 5/046
USPC .......................................................... 707/751
See application file for complete search history.

(56) References Cited

U.S. PATENT DOCUMENTS

| | | |
|---|---|---|
| 2010/0185689 A1 | 7/2010 | Hu et al. |
| 2012/0185340 A1 | 7/2012 | Sweeney |
| 2013/0073546 A1 | 3/2013 | Yan et al. |
| 2014/0258002 A1 | 9/2014 | Zimmerman et al. |
| 2014/0278845 A1 | 9/2014 | Teiser et al. |
| 2015/0046371 A1 | 2/2015 | Leary |
| 2019/0294881 A1* | 9/2019 | Polak .................. G06V 10/454 |

OTHER PUBLICATIONS

Non-Final Office Action dated Oct. 15, 2020 in U.S. Appl. No. 16/422,151.
Final Office Action dated Mar. 11, 2021 in U.S. Appl. No. 16/422,151.

* cited by examiner

SYSTEMS FOR CREATING AND/OR MAINTAINING DATABASES AND A SYSTEM FOR FACILITATING ONLINE ADVERTISING WITH IMPROVED PRIVACY

CROSS REFERENCE TO RELATED APPLICATION

The present application is a divisional application of U.S. patent application Ser. No. 16/422,151, filed May 24, 2019, which is incorporated herein by reference.

TECHNICAL FIELD

Embodiments of the present invention relate to systems for creating and/or maintaining databases, in particular server based systems for creating and/or maintaining databases, a system for facilitating online advertising with improved privacy in a network, and related methods.

BACKGROUND

The World Wide Web (WWW) has become one of the most important sources of information and is widely used as media channel for advertising. Processing and providing of data in the WWW) is a dynamic process. This also applies to digital (media) advertising often used to generate revenue for web site and web service providers. Typically, digital advertising or online advertising is provided in form of so-called ads (advertisements, ad for short), in particular as visual and/or audio ads, which are delivered dynamically and almost in real time on a webpage in the browser or in other kind of digital user interfaces like mobile apps or videos. By this it is possible that the specific ad shown embedded or next to a piece of content changes in time or differs depending on the user consuming the content.

Many technologies are available to target the digital user. This means, a system is selecting the ad to be displayed dependent on the individual user. Accordingly, a greater flexibility of advertisers and/or better tailored advertising campaigns may be achieved. For this the system needs to record, aggregate and store some kind of personal data or at least anonymous profiles based on personal data. For example, cookies may be used for user tracking and gathering information about the users, respectively.

However, there is a growing concern about the down sides of collecting huge amounts of personal data in the Web. Among other things, calculating user behavior based on personal data collection can facilitate their manipulation. Furthermore, data collecting, data processing and advertising are resource intensive with often only moderate success even if behavioral targeting is used.

Currently, there are increasing efforts to regulate collecting personal data. For example, in the EU the general data protection regulation (GDPR) got recently into effect. Accordingly, date collecting, storing and processing of any kind of personal data is subject to severe restrictions, needs to meet many prerequisites and any objection to these guidelines is subject to high penalties. GDPR applies to the data of any citizen of the EU, to any system that is located on the terrain of the EU and even to any person entering the territorial region of the EU. That means GDPR is even of global reach. With GDPR the use of targeting technologies that make use of personal data pose a high risk on any player in the market, the technology providers as data processors, the publishers as well as agencies and the advertisers themselves. Currently, the European e-Privacy regulation is in the final process of legislation at EU level. It will likely even more restrict the use of personal data in online advertising. E-Privacy is aiming at giving the user full control of the way his personal data is used and who it is shared with. For example, e-Privacy will disallow the storing of cookies unless given the explicit and informed consent by the user.

Accordingly, there is a need to further improve data collecting, data processing and/or digital advertising in a network, in particular in the WWW.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
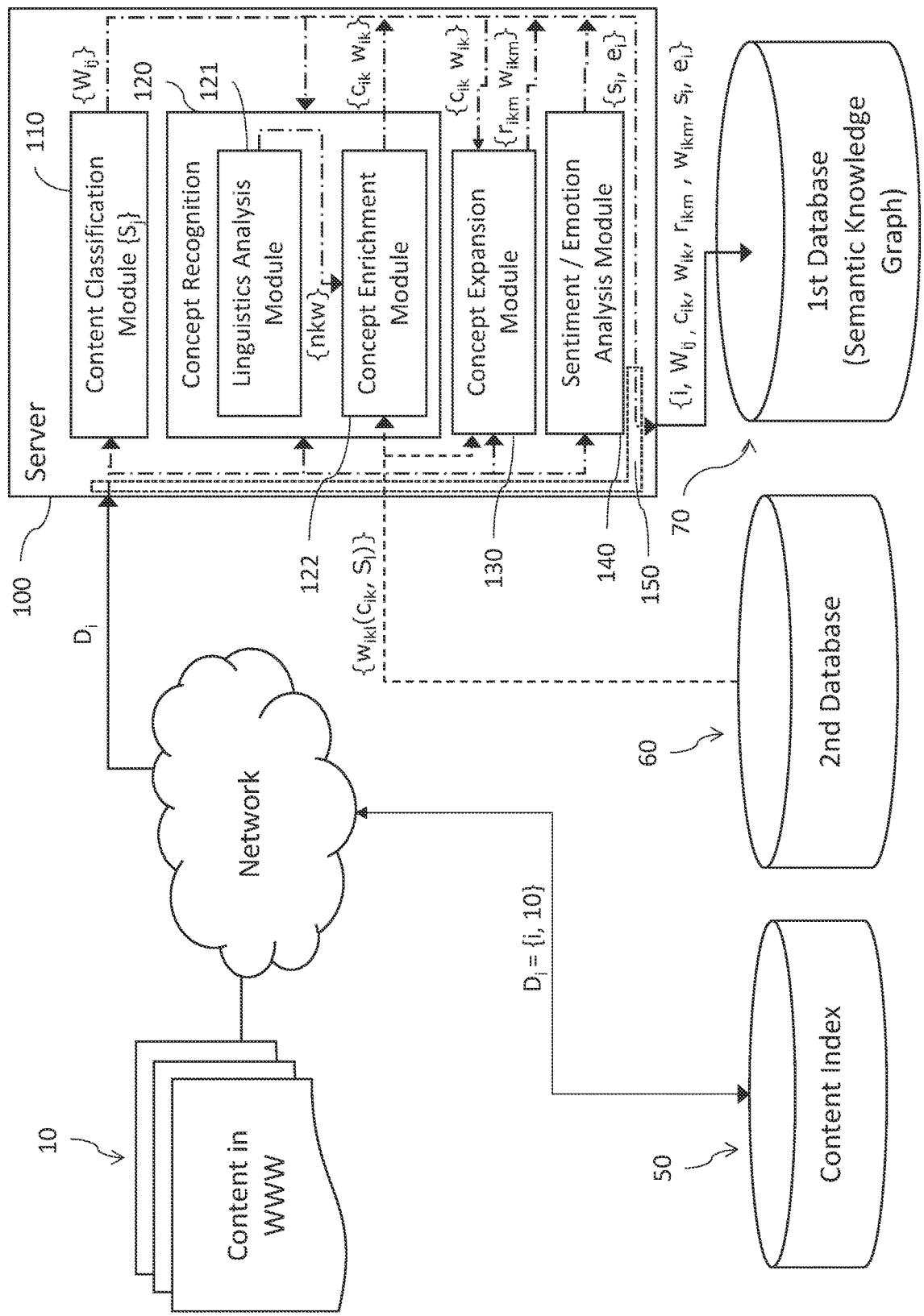
FIG. 1 is a block diagram schematically illustrating a system for creating, updating and/or maintaining a database and processes of a method for creating and/or maintaining the database according to embodiments.

According to an embodiment of a system for creating and/or maintaining a first database, the system includes one or more processors, a classification module that is, when executed by at least one of the one or more processors, configured to determine primary weights for primary data streams, each primary weight referring to a correlation between one of the primary data streams and one segment category of several predefined segment categories, a recognition module that is, when executed by at least one of the one or more processors, configured to identify explicit concepts and implicit concepts in the primary data streams, and to determine first secondary weights characterizing embeddings of the identified concepts in the respective main segment category with highest primary weight using a concept database storing weights for concepts within the predefined segment categories, an expansion module that is, when executed by at least one of the one or more processors, configured to determine for the identified (explicit and implicit) concepts respective related concepts and second secondary weights of the related concepts characterizing embeddings of the related concepts in at least one of the predefined segment categories; and a storage module that is, when executed by at least one of the one or more processors, configured to save the identified concepts, the first secondary weights, the related concepts, and the second secondary weights in the first database.

The primary data streams may refer to webpages provided in the network such as the WWW, and/or may represent a respective content of the webpages, in particular a respective text of websites to be displayed in a web application such as a web browser or in another application software (app), in particular a mobile app running on a client such as a client computer, for example a mobile client device such as a tablet or smartphone.

According to an embodiment of a computer-implemented method for creating and/or maintaining a first database, the method includes determining primary weights for primary data streams. Each primary weight refers to a correlation between one of the primary data streams and one segment category of several predefined segment categories. Concepts are identified in the primary data streams. This may include identifying explicit concepts and identifying implicit concepts. First secondary weights characterizing embeddings of the identified concepts in the respective main segment category with highest primary weight are determined using a concept database storing weights for concepts within the predefined segment categories. For the identified (explicit and implicit) concepts respective related concepts and second secondary weights of the related concepts characterizing embeddings of the related concepts in at least one of the predefined segment categories are determined.

The identified concepts, the first secondary weights, the related concepts, and the second secondary weights may be stored in the first database. The method typically includes identifying in the primary data streams a rating including at least one of a sentiment, and an emotion. The identified rating may also be stored in the first database.

According to an embodiment of a system for creating and/or maintaining a second database, the system includes one or more processors, a classification module that is, when executed by at least one of the one or more processors, configured to determine primary weights for primary data streams, each primary weight referring to a correlation between one of the primary data streams and one segment category of several predefined segment categories; a concept learning module that is, when executed by at least one of the one or more processors, configured to determine for known concepts which comprise a respective term found in the primary data streams embedding terms for the respective term and weights characterizing the embeddings of the embedding terms in the respective segment categories; and a storage module configured to update the known concepts stored in the second database in accordance with the embedding terms and weights characterizing the embeddings of the embedding terms.

According to an embodiment of a computer-implemented method for creating and/or maintaining a second database, the method includes determining primary weights for primary data streams. Each primary weight refers to a correlation between one of the primary data streams and one segment category of several predefined segment categories. For known concepts which comprise a respective term found in the primary data streams embedding terms and weights characterizing the embeddings of the embedding terms in the respective segment categories are determined. The known concepts stored in the second database may be updated in accordance with the embedding terms and the weights characterizing the embeddings of the embedding terms.

According to an embodiment of a system for creating and/or maintaining a third database, the system comprises one or more processors; a semantic analysis module that is, when executed by at least one of the one or more processors, configured to determine primary weighted semantic metadata for a content, in particular a target content or a content of an advertising campaign, using a database storing weights for concepts within predefined segment categories; a semantic expansion module, that is, when executed by at least one of the one or more processors, configured to determine secondary weighted semantic metadata for the content using a further database storing first concepts, first weights for the first concepts in predefined segment categories, second concepts that are related to the first concepts, and the second weights for the second concepts in the predefined segment categories. The semantic expansion module may be configured to identify a rating of the content. The rating includes at least one of a sentiment, and an emotion. The system may further comprise a storage module that is, when executed by at least one of the one or more processors, configured to store the respective weighted semantic metadata and optionally the rating in the third database. The third database may be a target database or a campaign database.

The target content may refer to webpages provided in the network such as the WWW, and/or may represent a respective content of the webpages, in particular a respective text of the websites to be displayed in a web application such as a web browser or in another application software (app), in particular a mobile app running on a client such as a client computer, for example a mobile client device such as a tablet or smartphone.

According to an embodiment of a computer-implemented method for determining semantic metadata for a content, in particular a target content or a content of an advertising campaign, the method includes determining primary weighted semantic metadata for the content using a database storing weights for concepts within predefined segment categories, and determining secondary weighted semantic metadata for the content using a further database storing first concepts, first weights for the first concepts in predefined segment categories, second concepts that are related to the first concepts, and the second weights for the second concepts in the predefined segment categories. The method may include identifying a rating of the content. The rating includes at least one of a sentiment, and an emotion. The method may further include storing the respective weighted semantic metadata in a database for content metadata, and optionally storing the rating in the database for content metadata. The database for content metadata may be a target database or a campaign database.

According to an embodiment of a system for facilitating online advertising in a network with improved privacy, the system includes one or more processors, a matching module that is, when executed by at least one of the one or more processors, configured to use weighted semantic target metadata for a target content which is provided in the network and weighted semantic campaign metadata for an advertising campaign which is to be presented in the network and refers to a respective product and/or a service to determine a matching parameter between the target content and the advertising campaign, and a management module that is, when executed by at least one of the one or more processors, configured to use the matching parameter for deciding if the advertising campaign is to be provided to the target content.

The system for facilitating online advertising is typically configured to initiate sending one or more advertising campaigns to client(s) at least substantially based on the matching parameter(s), or at least substantially based on the matching parameter(s) and identified ratings. Initiating sending the advertising campaign may be achieved without using any tracking data of registered users of the client. Accordingly, online advertising may be achieved in a privacy compliant manner.

Since no personal tracking data are required, less data have to be transferred through the network for advertising. Furthermore, less data space and/or less computational power may be required by the system and/or in the network. Accordingly online advertising may be achieved with lower energy consumption and more environmentally friendly, respectively. Even further, the runtime of mobile client devices may be increased as collecting and sending of personal tracking data can be avoided.

As the selection of the advertising campaigns is based on weighted content criteria (concept matching between advertising campaigns and of target such as websites), the placement of the advertising campaigns may be achieved with higher target accuracy. This is facilitated by taking into account implicit concept and/or sentiments. Note that misplacements of advertising campaigns may be at least substantially reduced. All this may also contribute to more environmentally friendly advertising in the network and even lead to an increased acceptance of advertising by the users as well as increased revenue per advertising campaign for service/content providers in the network.

As the selection of the advertising campaigns is considering topical surroundings of any kind (including quotations of topics in connection with certain places, times or events or other topics in general), the advertising campaign may be able to appeal to latent interests of the user and in this way address target groups that are not reached by user-based targeting.

As the placements of the advertising campaigns may be optimized for highest effectivity and more meaningful relation to what the user is reading, viewing or hearing, the number of placed ads can be reduced and therefore publisher web-sites will be less cluttered with ads and users do not need to make use of ad-blocking extensions in their web browsers.

The system for facilitating online advertising may include at least portions of the system for creating and/or maintaining the first database, the system for creating and/or maintaining the second database and/or the system for creating and/or maintaining the third database as respective sub-systems.

The system for facilitating online advertising typically includes one server connectable to the network via a respective interface or several (interconnectable) servers, for example one server for each sub-system.

According to an embodiment of a computer-implemented method for facilitating online advertising in a network with improved privacy, the method includes using weighted semantic target metadata for a target content which is provided in the network, and weighted semantic campaign metadata for an advertising campaign which is to be presented in the network and refers to a respective product and/or a service to determine a matching parameter between the target content and the advertising campaign. The matching parameter is used for deciding if the advertising campaign is to be provided to the target content.

The respective weighted semantic metadata may be retrieved from respective (third) databases (target database, campaign database), and/or determined by the methods explained herein, in particular the method for determining semantic metadata for a content.

Other embodiments include corresponding computer-readable storage media or devices, and computer programs recorded on one or more computer-readable storage media or computer storage devices, each configured to perform the processes of the methods described herein.

The computer program product and/or a computer-readable storage medium may include instructions which, when executed by a one or more processors of a system, in particular data processing system (also referred to as information processing system) connectable to network, cause the system to carry out the processes of the methods explained herein.

The system of and/or including one or more computers and/or processors can be configured to perform particular operations or processes by virtue of software, firmware, hardware, or any combination thereof installed on the one or more computers and/or processors that in operation may cause a data processing system to perform the processes.

Those skilled in the art will recognize additional features and advantages upon reading the following detailed description, and upon viewing the accompanying drawings.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 illustrates in a block diagram a system 100 and processes for creating, updating and/or maintaining a first database 70. In the exemplary embodiment, the first database 70 stores the data, which refer to respective content 10 such as the content of websites presented via and/or in a network, in a semantic knowledge graph. In the following, the semantic knowledge graph is also referred to as SKG. The semantic knowledge graph structures are particularly well suited for retrieving the stored data/information $\{i, W_{ij}, c_{ik}, w_{ik}, r_{ikm}, w_{ikm}, s_i, e_i\}$. Note that brackets $\{\ \}$ indicate a collection of values and/or data which may have indices (subscripts), in particular data sets.

The system 100 may be implemented as or include a server 100 connected to the network and having access to and/or hosting the first database 70 and a second database 60 that may be used for determining the data to be stored in the first database 70. In the following, the first database 70 and the second database 60 are also referred to as first database 70 and concept database 60, respectively. Creating, updating and/or maintaining the second database 60 is explained below with regard to FIG. 2.

The system and server 100, respectively, may be a subsystem of the systems 500, 500' explained below with regard to FIGS. 5 and 6.

The server 100 may be used for pre-emptive crawling the network and knowledge graph generation.

For sake of clarity, only modules (or components) that may be implemented in software and executed by one or more processors of the server 100 as well as flow of data/information (arrows) are shown, whereas the hardware components such as the processor(s) and storage media are omitted. This applies also to the following figures.

Improved advertising typically includes anticipating probable associations and emotions a user might have when consuming (reading or viewing) certain content in the internet (WWW). This allows for displaying the user commercial ads that most likely have a positive impact on the user—without even knowing who he is. Likewise, presenting the user ads of a brand that put the brand and/or its commercial message in a negative context may be avoided.

To achieve that, knowledge about the relevance and sentiment about any given topic in various predefined segment categories $\{S_j\}$, wherein j is a positive integer, is to be systematically and continuously built up and typically stored as SKG in the first database 70.

The predefined segment categories $\{S_j\}$ correspond to subject domains or (generic) topics. Segment categories may but must not correspond to content categories on web-sites like "finance", "travel", "personal health" etc. Segment categories can be organized hierarchically in a taxonomy. This includes lower-tier categories like "Disasters" in "News and Politis", "Insurance" in "Personal Finance" or "Celebrity Pregnancy" in "Pop culture". Segment categories can systematically be extended by N sub-level-segments (lower-level tiers) for a higher precision of the system.

For generating the SKG, a web-crawler (not shown) may search through the web to generate primary data streams referring to web-pages 10. In the following the primary data streams are also referred to as primary data.

The web-crawler may extract respective primary content $D_i$ from i URLs (Uniform Resource Locator, web address), wherein i is a typically large positive integer. For example, the number i of extract respective primary content $D_i$ (e.g. from i webpages) may be larger than $10^4$, more typically larger than $10^6$, and even more typically larger than $10^8$. The primary content $D_i$ may be defined by the body content of a web page, its title and various other meta-data like author, time of publishing etc. The URLs along with the primary content $D_i$ may be stored in a content index database 50. The primary content is also referred to as target content herein.

Each primary content $D_i$ may be processed by the modules of the exemplary server 100.

First, a content classification module 110 may be used to determine for primary content $D_i$ and thus for the primary data primary weights $\{W_{ij}\}$ representing a respective correlation between the content of the primary data $D_i$ and one segment category $S_j$ of the predefined segment categories $\{S_j\}$.

Furthermore, the segment category with highest primary weight $(Max\{w_{ij}\},j))$ may be determined as main segment category of the respective primary data $D_i$.

All this is typically achieved using a trained neural network, in particular a trained CNN. In so doing, the primary content $D_i$ may be enriched by a data-set (metadata) assigning the content belonging to several of predefined segment categories $\{S_j\}$ with specific weights $\{W_{ij}\}$.

The term "neural network" (NN) as used in this specification intends to describe an artificial neural network (ANN) including a plurality of connected units or nodes called artificial neurons. The output signal of an artificial neuron is calculated by a (non-linear) activation function of the sum of its inputs signal(s). The connections between the artificial neurons typically have respective weights (gain factors for the transferred output signal(s)) that are adjusted during one or more learning phases. Other parameters of the NN that may or may not be modified during learning may include parameters of the activation function of the artificial neurons such as a threshold. Typically, the artificial neurons are organized in layers. The most basic NN architecture, which is known as a "Multi-Layer Perceptron", is a sequence of so called fully connected layers. A layer consists of multiple distinct units (neurons) each computing a linear combination of the input followed by a nonlinear activation function. Different layers (of neurons) may perform different kinds of transformations on their respective inputs. Neural networks may be implemented in software, firmware, hardware, or any combination thereof. In the learning phase(s), a machine learning method, in particular a supervised, unsupervised or semi-supervised (deep) learning method may be used. For example, a deep learning technique, in particular a gradient descent technique such as backpropagation may be used for training of (feedforward) NNs having a layered architecture (deep neural networks). Modern computer hardware, e.g. GPUs makes backpropagation efficient for many-layered neural networks. A convolutional neural network (CNN) is a feed-forward artificial neural network that includes like most other NNs an input (neural network) layer, an output (neural network) layer, and one or more hidden (neural network) layers arranged between the input layer and the output layer. The specialty of CNNs is the usage of convolutional layers performing the mathematical operation of a convolution of the input with a kernel. The hidden layers of a CNN may include convolutional layers as well as optional pooling layers (for down sampling the output of a previous layer before inputting it to the next layer), fully connected layers and normalization layers. At least one of the hidden layers of a CNN is a convolutional neural network layer, in the following also referred to as convolutional layer. The usage of convolutional layer(s) can help to compute recurring features in the input more efficiently than fully connected layers. Accordingly, memory footprint may be reduced and performance improved. Due to the shared-weights architecture and translation invariance characteristics, CNNs are also known as shift invariant or space invariant artificial neural networks (SIANNs).

Thereafter, the enriched primary content $D_i$, $W_{ij}$ may be processed by a (concept) recognition module 120 typically having a linguistic analysis module 121 and a concept enrichment module 122 to identify explicit concepts and implicit concepts $\{c_{ik}\}$ in content of the primary data streams $D_i$.

In particular, the linguistic analysis module may determine/further enrich the primary content with a respective normalized set of keywords by linguistic processing, i.e. keywords which are normalized to its base form in a linguistic sense. This typically includes normalisation to the corresponding lemma or canonical form like e.g. the lemma "run" for words like "runs", "ran" or "running". Normalisation also includes mapping of phrases including different word types like "running experience" to sentences like "With the new running shoe I experienced that jogging can actually be a lot of fun".

The linguistic processing typically includes determining morphological variations of words in individual languages.

The linguistic processing is typically a pre-processing of the concept enrichment module 122. It increases the efficiency of the concept recognition module 122, as it allows identifying implicit concepts which are within the primary data (text), but are used in a syntactically different way. For example, the concept "product development" can be identified from a phrase like " . . . the ability to develop sustainable and ecological products".

Typically, concepts embrace mental representations, abstract objects or abilities that make up the fundamental building blocks of thoughts and beliefs. Within this specification the term "concept" is used in a semantic sense and intends to describe an aggregation of terms and/or words including synonyms and abbreviations. In other words, a "concept" typically includes several semantically similar words and terms, respectively, which are used by humans to express any kind of thought, fact or cognition in natural language.

Within this specification the term "term" is intended to describe a word that has meaning (semantics) and most often refers to objects, ideas, events or a state of affair.

Concepts can either be abstract terms like "virus" or "product development" but also named entities referring to physical objects like persons ("Alfred Einstein"), organisations ("United Nations"), places ("Rome" or "Asia" or "pacific ocean") or products ("iPhone" or "skim milk") or any other kind and class of physical entities that can be referenced by its respective name.

Using concepts (aggregated terms and words) instead of terms and words substantially improves performance as the huge number of terms and words used in languages can be mapped to a reduced number of concepts.

The use of linguistic processing strongly increases the recall of assigning relevant concepts to content without requiring these implicit concepts to appear inside the content in exact the same way as explicit concepts. Implicit concepts may be morphologically different and/or distributed within a sentence or paragraph as word(s)/terms/phrases describing the concept.

Thereafter, resulting data may be further processed by the concept enrichment module 122. As illustrated in FIG. 1, the concept enrichment module 122 has access to $2^{nd}$ database 60 (concept database), for example via an interface or storage module 150.

The concept database 60 is used to identify concepts $c_{ik}$ in the primary content, regardless of its explicit mentioning. E.g. the concept "virus (technology)" can be identified in content with use of words like "spyware" or "malware", without the term "virus" explicitly being mentioned in the text. The enriched concepts can therefore either be explicitly mentioned or implicitly, like in the above example. The use of implicit concepts strongly increases the recall of the system to assign relevant concepts to content without requiring the word describing the concept to explicitly appear in the text.

Furthermore, the concept enrichment module 122 may assign an individual (first) secondary weight $w_{ik}$ to each implicit or explicit concept $c_{ik}$. The secondary weights $w_{ik}$ are typically calculated based on the characteristic embeddings of the respective concept $c_{ik}$ in the segment $S_j$ the content is classified to by the classification module 110. This is explained in more detail below with regard to FIG. 3.

For example, consider a primary content $D_i$ about a rock star and his latest concert. In a side note it is stated that the concert started half an hour later because of a traffic jam. The concept "traffic jam" will not carry a high (secondary) weight in the main segment category "rock music". Indeed, the concept "traffic jam" it is not relevant for the understanding of the main text of the primary content and is very likely of no particular interest for users, who are interested in rock music and/or the particular rock star.

Thereafter, related concepts $\{r_{ikm}\}$ and corresponding (second) secondary weights $\{w_{ikm}\}$ characterizing embeddings of the related concepts $\{Nun\}$ in at least one of the predefined segment categories $S_j$ may be determined by a concept expansion module 130.

Typically, each concept $c_{ik}$ is expanded/supplemented by a respective set of related concepts $\{r_{ikm}\}$, either within the same (main) segment category or any other segment category $S_j$. Note that individual concepts are scored by weights based on its significance with that very segment.

Accordingly, events, situations, places or any other items in the physical world may be identified, that are in the environment or related to identified concept $c_{ik}$.

For example, the concept "virus" might be related to a concept like "hacking" or "dating platform" in the context and segment category, respectively, of "technology" or to a concept like "chicken" or "blood" in the segment categories "food", "travel" and "health", respectively.

Likewise, the concepts of the above mentioned example of primary content referring to the rock concert may be expanded by related concepts $\{r_{ikm}\}$ like "drinking" or "alcohol" in the segment category "events & attractions".

Thereafter, a sentiment and/or emotion analysis module 140, which is typically based on another trained neural network, in particular another trained CNN, is used to determine sentiments $s_i$ and/or emotions $e_i$ in the primary content $D_i$.

Emotions may be defined as emotions like anger, fear or love, which can be extracted from content. For example, the use of many "!!!" in combination with words like "finally" or "shit" can be assigned by a CNN to belong to the emotion class "anger". By this procedure the process can identify emotions that are related to certain concepts, events or situations in the text (e.g. the emotion "surprise" in a text about a political election) or are direct utterances and emotions of the author of the content (e.g. in comments or user-generated content in social media).

For simplicity reasons the emotion analysis can also be restricted to a sentiment analysis, which scores the content to be positive or negative on a continuous scale between +1 and −1.

As a result the full set of data $\{i, W_{ij}, c_{ik}, w_{ik}, r_{ikm}, w_{ikm}, s_i, e_i\}$ including explicitly and implicit concepts and sentiments including its weighted assignment to segment categories and scored relationships may be stored in the first database 70 (as a semantic knowledge graph).

The semantic knowledge graph typically represents an actual (depending on the periodicity of the full process cycle) representation of what is relevant in different segments categories and how things are interrelated.

Typically, the semantic knowledge graph is updated or newly generated from time to time, for example periodically.

In effect this allows representing time-dependent and trend-aware knowledge about the relevance and sentiment/emotion of concepts and their respective surroundings in different segment categories.

The SKG may include more content/data than required for analysing target content of webpages and content of advertising campaigns, as it is typically built to represent as much knowledge as possible.

Figure 2:
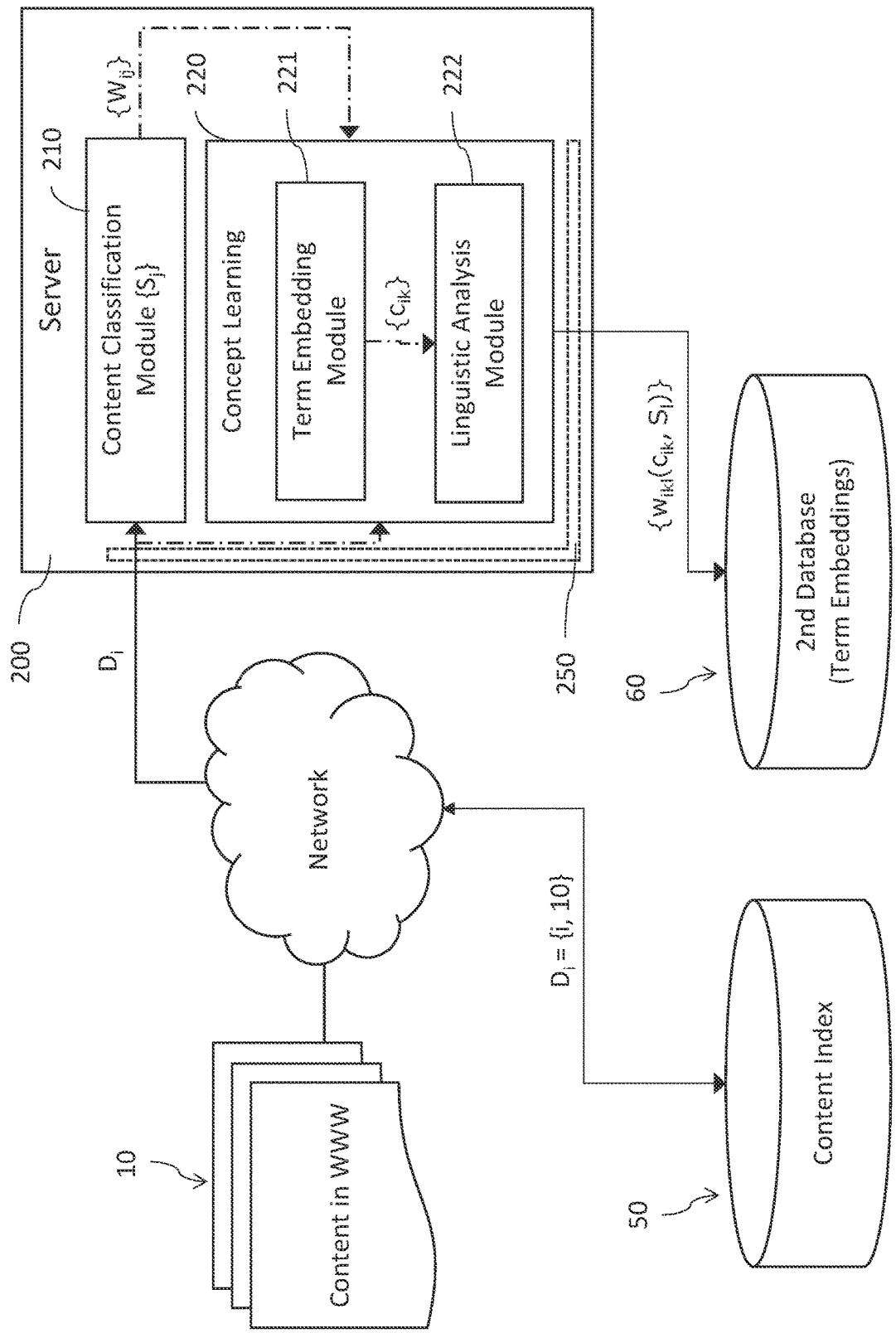
FIG. 2 is a block diagram schematically illustrating a system for maintaining a database and processes of a method for maintaining the database according to embodiments.

FIG. 2 illustrates in a block diagram a system 200 and processes for maintaining the second database 60 used for generating the SKN. The system and server 200, respectively, may be a sub-system of the systems 500, 500' explained below with regard to FIGS. 5 and 6.

Similar as explained above with regard to FIG. 1, respective content 10 may be obtained using a web-crawler, parsed, and URLs and the primary content $D_i$ stored in the content index database 50 and/or retrieved from the database 50.

Typically, the system 200 is provided by and/or includes a server 200.

The primary content $D_i$ may be fed via an interface or storage module 250 to a classification module 210 typically implementing the same or similar processes as the classification module 110 explained above with regard to FIG. 1.

In particular, primary weights $\{W_{ij}\}$ may be determined by module 210 for the primary data streams $D_i$. Each primary weight $W_{ij}$ corresponds to a correlation between one of the primary data $D_i$ and one segment category $S_j$ of the predefined segment categories $\{S_j\}$.

Thereafter, a concept learning module 220 may be used to compute specific data for the existing concepts in all categories $\{S_j\}$, typically by calculating term and/or word embeddings for all the concepts $\{c_{ik}\}$ which are specific to the respective segment $S_j$ using a term embedding module 221.

In addition, a linguistic module 222 may compute the base forms of different appearances of concepts in its full forms (e.g. viruses, plural and also "viral infection" normalized to "virus").

As a result embedding terms $\{c_{jk}\}$ and their weights $\{w_{jkl}\}$ characterizing the embeddings of the embedding terms in the respective segment categories $(S_{j*})$ are determined by the (concept) learning module 220 and stored in the concept database 60. This is explained in some more detail below with regard to FIG. 3.

Note that the above described processes of building the SKG is facilitated by a fine-granular understanding of concepts, regardless of how exactly they are described by certain words within a text.

The term embedding module 221 of learning module 220 is typically implemented as a deep learning module based on a neural network which calculates the specific term embeddings of a term in a certain segment (see FIG. 1b). E.g. the embeddings (embedding terms) for the term (word) virus would be "inflammation", "infection", "HIV", "bacteria" derived from content within the segment of "health" or "ransomware", "trojan", "spyware" in the segment category of "internet"

The term embedding module 221 is effective to interpret the context-specific meaning of a certain word (terms) and in particular to disambiguate between the different meanings of homonyms.

The subsequently used linguistic analysis module 222 normalizes the names of identified concepts to a base form. This strongly increases the productivity in a process where the concepts are directly displayed, as the system automatically merge different variations of the names of the very same concept to one normalized base form. For example, the plural mentioning of "viruses" is always reduced to the singular form "virus".

The normalized base form is stored in the concept database 60 together with its explicitly mentioned full forms. In other words, concepts are typically stored in its base form in the concept database 60.

Figure 3:
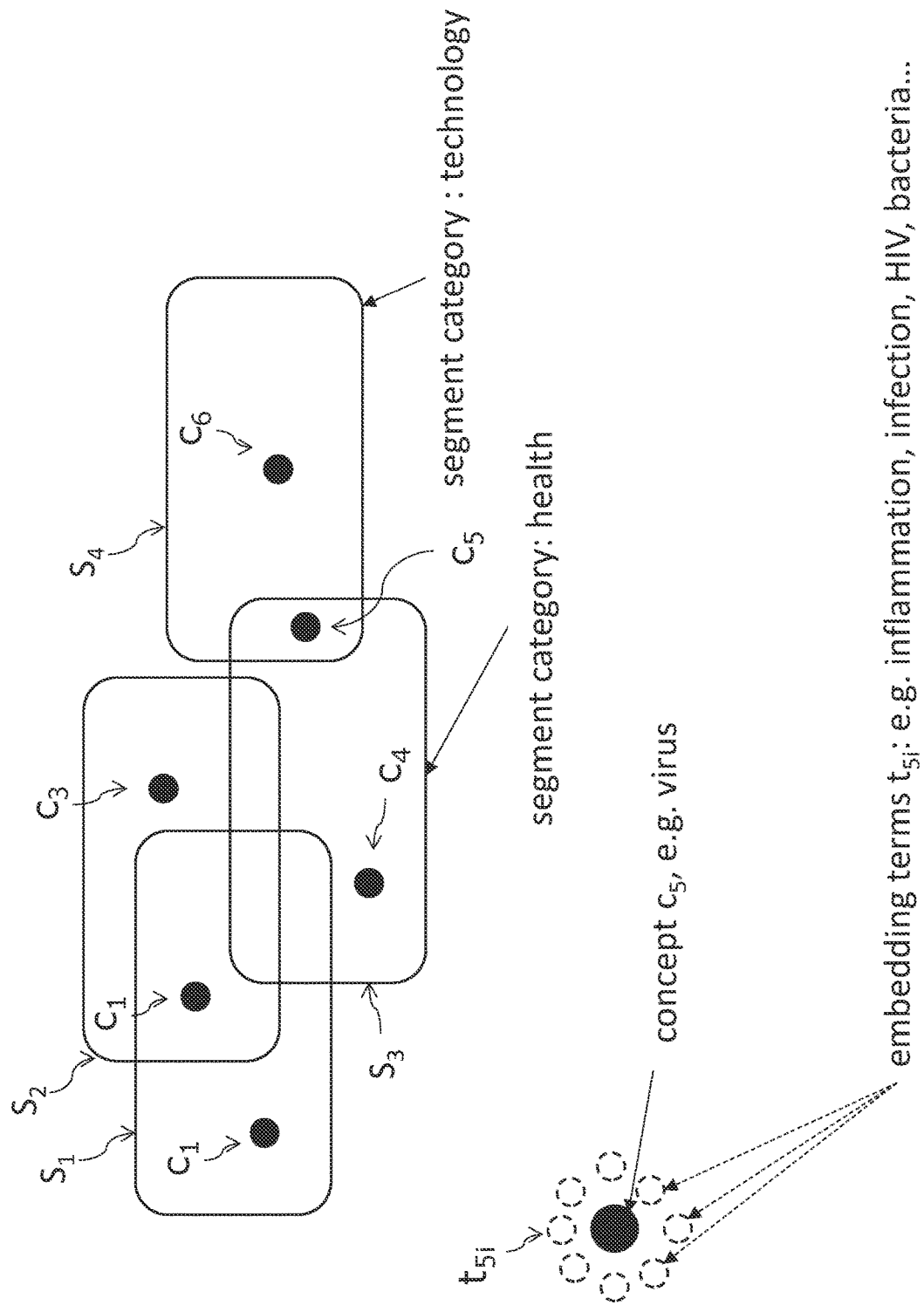
FIG. 3 schematically illustrates processes of a method for maintaining the database according to embodiments.

FIG. 3 schematically illustrates how terms are embedded by other terms (embedding terms) with a certain weight and processes for determining the embedding terms (embeddings).

In the exemplary embodiment, six concepts $c_1$ to $c_6$ are shown including their segment category $S_1$ to $S_4$. The term virus represents the exemplary concept $c_5$. The concept $c_5$ has therefore different meanings in the segment categories $S_3$ (health) and $S_4$ (technology).

For example, the word virus could either be the cause of an infection of humans concept in the segment category $S_3$ or an infection of a computer in the segment category $S_4$.

The different meanings may be determined from embedding terms. Embedding terms are words (terms) which are typically synonyms and/or frequently used in a similar way and with similar meaning.

In the exemplary embodiment, eight embedding terms $t_{5i}$ like inflammation, infection, HIV, bacteria of the concept (term) $c_5$ "virus" are shown.

The term embedding module 221 is configured to determine how a term is embedded by other terms with a respective weight that reconstructs the linguistic contexts of the terms. The weight correspond to a certain probability of other words to appear in the same linguistic contexts. As a result these terms usually are either synonyms, abbreviations or sub- or super-ordinate terms (specialisations or generalisations) of the respective term appearing in the primary content $D_i$.

These embeddings may be calculated individually from the content $D_i$ within all the different segment categories $S_j$.

Typically, a word embedding algorithm such as such as Googles word2vec algorithm is used for determining the weights characterizing the embeddings of the embedding terms $t_{5i}$ with respect to (primary) terms taken as a basis for concepts.

In effect this allows disambiguating the specific meaning of a word/term in different contexts (segment categories). Accordingly, well-defined concepts may be determined from words/terms.

According to an embodiment of computer-implemented method for determining concepts, the method includes determining primary weights ($\{W_{ij}\}$) for a plurality of primary content, each of which is typically derived from a respective primary data (stream). Each primary weight refers to a correlation between one primary content and one segment category ($S_j$) of several predefined segment categories. Primary terms are identified in each primary content. The primary terms are typically normalized to their respective base form. Embedding terms and their weights with respect to the primary terms within the predefined segment categories are determined. Concepts are determined. Each concept is based on one of the primary terms, the embedding terms for the primary term and the respective weights. Typically, the concepts are stored in a concept database.

Figure 4:
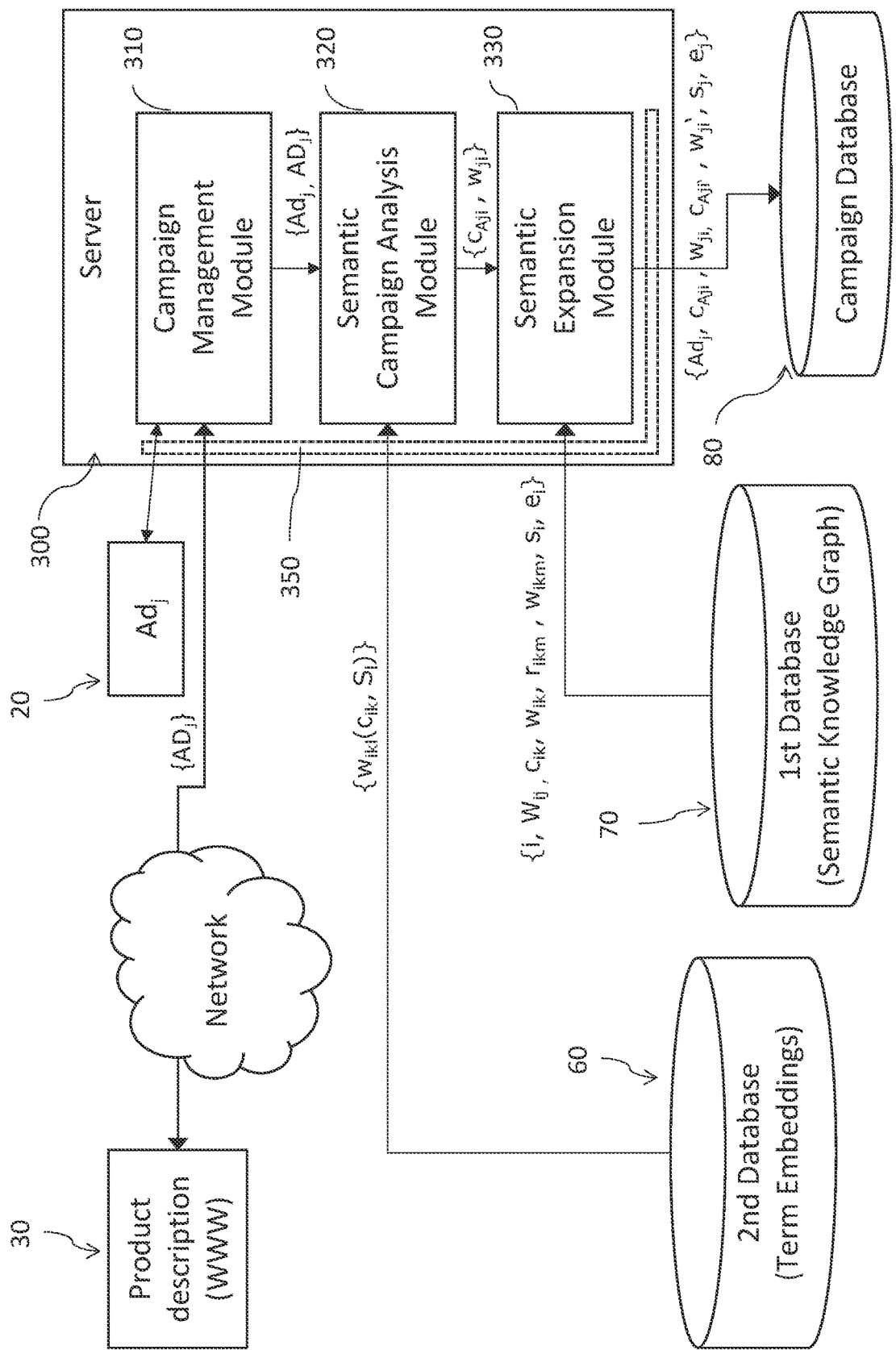
FIG. 4 is a block diagram schematically illustrating a system for creating and/or maintaining a database and processes of a method for creating and/or maintaining the database according to embodiments.

FIG. 4 illustrates in a block diagram a system 300 and processes for creating and/or maintaining a campaign database 80.

Typically, the system 300 is provided by and/or includes a server 300. In the following, the system 300 is also referred to as campaign analyzing system. The system and server 300, respectively, may be a sub-system of the systems 500, 500' explained below with regard to FIGS. 5 and 6.

Advertising campaigns $Ad_j$ are sent to the server 300 and registered in a campaign management module 310, for example from a server 20 via the network and/or an interface or storage module 350. In the following, the campaign management module 310 is also referred to as management module.

The management module typically request additional information {AD$_j$} regarding the advertised brand, service or product from the network such as product descriptions 30, user comments and the like.

The content of the respective campaign Ad$_j$ and the received content of the respective additional information (also referred to as additional content) {AD$_j$}, e.g. describing the product (like landing page of campaign) is may be send to a semantic analysis module 320.

The semantic analysis module 320 may be used to identify relevant concepts $c_{Aji}$ for the ads Ad$_j$, which are typically retrieved from the concept database 60 storing weights {$w_{ikl}$} for concepts {$c_{ik}$} within predefined segment categories {$S_1$}.

The semantic campaign analysis module 320 typically analyses the content of the ads Ad$_j$ and enriches it with semantic meta-data.

Further, the semantic campaign analysis module 230 may be effectively identical to the linguistics analysis and concept enrichment module 120 explained above with regard to FIG. 1. That means that is also configured to identify the explicit and implicit concepts of the ads Ad$_j$.

For example, for an ad about "espresso" the semantic campaign analysis module 220 may assign concepts like "espresso" but also the implicitly found concept "coffee" as retrieved from the concept database 60.

Thereafter, a semantic expansion module 330, which retrieves its data from the first database 70, may be used for adding surrounding topics.

The semantic expansion module 330 typically analyses content of the ads Ad$_j$ and expands it with other concepts as stored and retrieved from the first database 70.

In the above example of the ad referring to "espresso", related concepts like "breakfast" (in the segment category of "food") or "Italy" (in the segment category of "travel") may be determined.

More specifically, the semantic analysis module 320 may determine primary weighted semantic metadata {$c_{Aji}$, $w_{ji}$} for the advertising campaigns Ad$_j$ using the second database 60 storing weights {$w_{ikl}$} for concepts $c_{ik}$ within predefined segment categories $S_1$; and the semantic expansion module 330 may determine secondary weighted semantic metadata {$c_{Aji'}$, $w_{ji'}$} for the advertising campaigns Ad$_j$ (and referring to surrounding topics) using the first database 70 which stores first concepts {$c_{ik}$}, first weights {$w_{ik}$} for the first concepts in predefined segment categories ({$S_j$}), second concepts ({$r_{ikm}$}) that are related to the first concepts, and the second weights ({$w_{ikm}$}) for the second concepts (related concepts) in predefined segment categories ({$S_j$}), and ratings {$s_i$, $e_i$} of the advertising campaigns Ad$_j$.

The thus expanded concepts (weighted metadata) are stored in the campaign database 80, typically together with the primary campaign data Ad$_j$.

Optionally, the concepts and weighted metadata in the campaign database for a given campaign Ad$_j$ can be edited and modified by a campaign manager. This may include:

- Manually adding other concepts or expanded concepts, e.g. "tired" and "coffein" (in the context of "personal health"), and/or
- Changing the automatically computed sentiment $s_i$ of a certain related concept for the given campaign (e.g. setting the sentiment of the concept "plane", which has a trend-aware negative sentiment because of a recent plane crash, to a positive sentiment, because the campaign is from a railway company that competes with air travel.)

Figure 5:
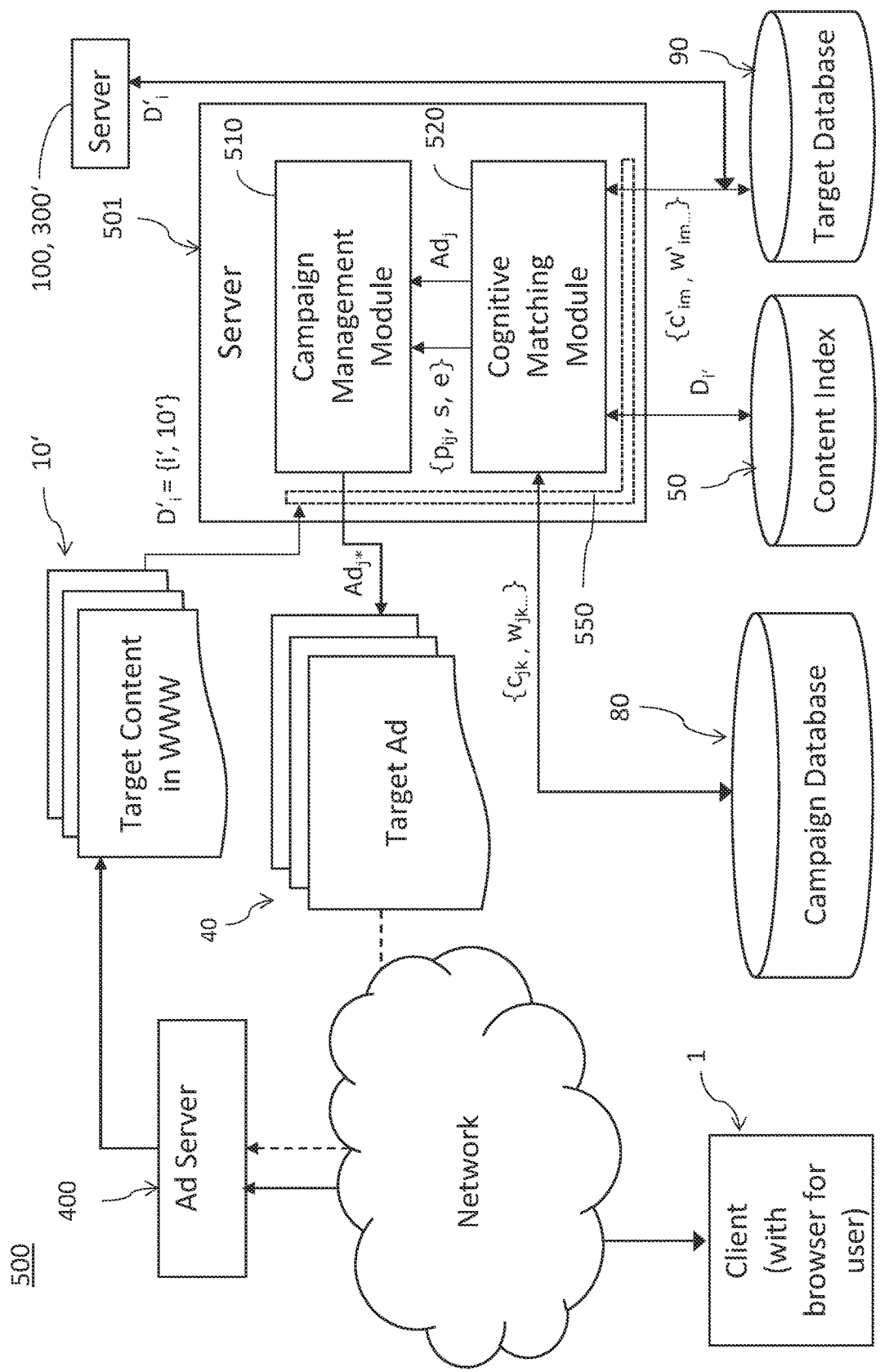
FIG. 5 is a block diagram schematically illustrating a system for facilitating online advertising with improved privacy and processes of a method for facilitating online advertising with improved privacy according to embodiments.

FIG. 5 is a block diagram illustrating a system 500 and processes for facilitating online advertising in network with improved privacy.

A client device 1 may retrieve on a request of a user an URL in the network. For example, the user may navigate in the WWW and retrieve the URL using a browser displayed on a display of the client device 1. This may be detected by an Ad server 400. The Ad server 400 may declare the webpage, referenced by this URL, as a target content page 10', which is subsequently forwarded to a matching server 501.

A (campaign) management module 510 of the server 501 may compare the URL of the target content page 10' (target URL) with all URLs stored in the content index database 50.

If the target URL is not yet stored in the index, the URL may be processed by a server 100 as explained above with regard to FIG. 1 and/or a server 300' operating similar to the server 300 as explained above with regard to FIG. 4, but analysing content of target pages (target content) D'$_i$ instead of ads and storing the determined weighted metadata for the target content in a target database 90.

Note that the semantic expansion processes of determining the second concepts that are related to the first concepts as explained above with regard to the module 320 is typically omitted during analysing the target content D'$_i$. Alternatively, these semantic expansion processes may be omitted during analysing the ads Ad$_j$. However, the latter may be less performant. Furthermore, the content of the target pages is typically only analysed by the server 300' on request to save data space. In other words, the target database 90 may be omitted.

On request of the campaign management module 510, a matching module 520 determines for the target content D'$_i$ a matching parameter $p_{ij}$ with advertising campaigns Ad$_j$ using weighted semantic target metadata for the target content 10' provided by the target data base 90 or the server 300', and weighted semantic target metadata for the advertising campaigns Ad$_j$ provided by the campaign database 80.

The weighted semantic target metadata for the target content 10' may include weights $w'_{im}$ for the concepts $c_{im}'$ of the target content 10', and the weighted semantic campaign metadata may include weights $w_{jk}$ for the concepts $c_{jk}$ of the advertising campaigns Ad$_j$.

The pairwise matching parameter $p_{ij}$ is typically determined as a function of the weights $w'_{im}$ and $w_{jk}$ of common concepts $c_{im}'=c_{jk}$, for example a function of the products $w'_{im}*w_{jk}$ of the common concepts $c_{im}'=c_{jk}$.

In one embodiment, the pairwise matching parameter $p_{ij}$ is determined as sum of the products $w'_{im}*w_{jk}$ of the common concepts $c_{im}'=c_{jk}$:

$$p_{ij}=\text{Sum}(w_{jk}*w'_{im}, \forall c_{im}'=c_{jk}) \quad (1)$$

A higher matching parameter $p_{ij}$ indicates a better concept match between the target content 10' and the ads Ad$_j$. Accordingly, the matching parameter $p_{ij}$ may be used for ranking the ads Ad$_j$ with respect to the target content 10'.

Typically, the matching module 520 also provides any sentiments s and/or emotions e stored for the advertising campaigns Ad$_j$ in the campaign database 80 and/or any sentiments s and/or emotions e of the target content 10' to the campaign management module 510.

The sentiments s and/or emotions e may also be used for ranking the ads Ad$_j$.

Typically, emotions e are measured on a scale with different values while sentiments binary values such as +1, −1 representing positive emotion and negative emotions, respectively.

Typically, the matching parameter $p_{ij}$ is increased if the emotions or sentiments of the target content 10' and the advertising campaigns $Ad_j$ are both positive, if only one positive emotion or sentiment is found, but also if the emotions or sentiments of the target content 10' and the advertising campaigns $Ad_j$ are both negative. Likewise, the matching parameter $p_{ij}$ is typically decreased if only one negative emotion or sentiment is found. This may however be overruled (see the example for negative sentiment below). If no emotions and sentiments are found, the matching parameter $p_{ij}$ may remain unchanged.

For example, the matching parameter $p_{ij}$ may be multiplied with the product of found sentiment values $s_T$ of the target content and $s_A$ of the target ad $Ad_j$.

$$p_{ij} = s'_T * s'_A * \text{Sum}(w_{jk} * w'_{im}, \forall c_{im}' = c_{jk}) \quad (2)$$

In eq. 2, $s'_T$ and $s'_A$ are equal to 1 if the respective sentiment $s_T$ and $s_A$ is not found and equal to the respective values of $s_T$ and $s_A$ otherwise.

As a result a ranked or scored list 40 ($\{Ad_{j*}\}$) of the ads $Ad_j$ may be provided.

The Ad server 400 may then deliver the ad with the highest rank or score (or another one depending on other rulesets defined in the ad server) to the client.

In particular, the IDs of the ads with the highest matching scores are sent to an ad server. The ad server delivers the target ad with the highest matching score (or another one, if other rules for ad targeting are applied and overrule this matching rule) to the target content page, the user is actually consuming.

Alternatively, for campaign planning, all URLs with the highest score are sent to an ad tech system to place the ads preferably on those web URLs (white list) and all URLs with high negative scores preferably not on these URLs (blacklist).

In the following, the examples for using sentiments and/or emotions are given.

In one example, an advertising campaign of a railway company with an enriched emotion of sadness in relation to the concept of "plane" or "air travel" is considered to be positive with respect to a target URL with the enriched concept "plane".

The matching function may support two different purposes, the positive correlation between content and ad (for best fitting the message of the commercial ad to the consumed content) and the negative correlation (for avoiding showing messages within a content context that puts the brand into a negative or compromising context).

Examples: For Positive Fitting

The matching functions identifies the expanded concept "Italy" assigned to an ad about "espresso" by the semantic expansion module and calculates a positive match with an article that has a high weight with the explicit concept "Rome" and the implicit concept "Italy".

The cognitive matching module calculates a continuous (relevance) score of the target URL for every ad registered as active in the campaign management module.

For avoiding bad placements of ads, placements which have a negative score are to be avoided.

Example for Avoiding Negatively Connotated Placements

The matching functions identifies the concept "alcohol" assigned to an ad about "whiskey" by the semantic expansion module and calculates a negative match with an article that has a high weight with the explicit concepts "alcohol" and "health" but has a strong negative sentiment, because it describes the bad consequences of alcohol to personal health.

However, there are cases where a negative sentiment of the target content may not lead to exclusion depending on the campaign.

Example for Deliberately Placing an Ad within a Negative Sentiment

The target content is about a mass pileup on a highway and the ad refers to a "Relaxed travel" campaign of a railway company. While the target content would be rated negative for an ad of a "car manufacturer" it could consciously be evaluated as a positive match for the railway company.

Figure 6:
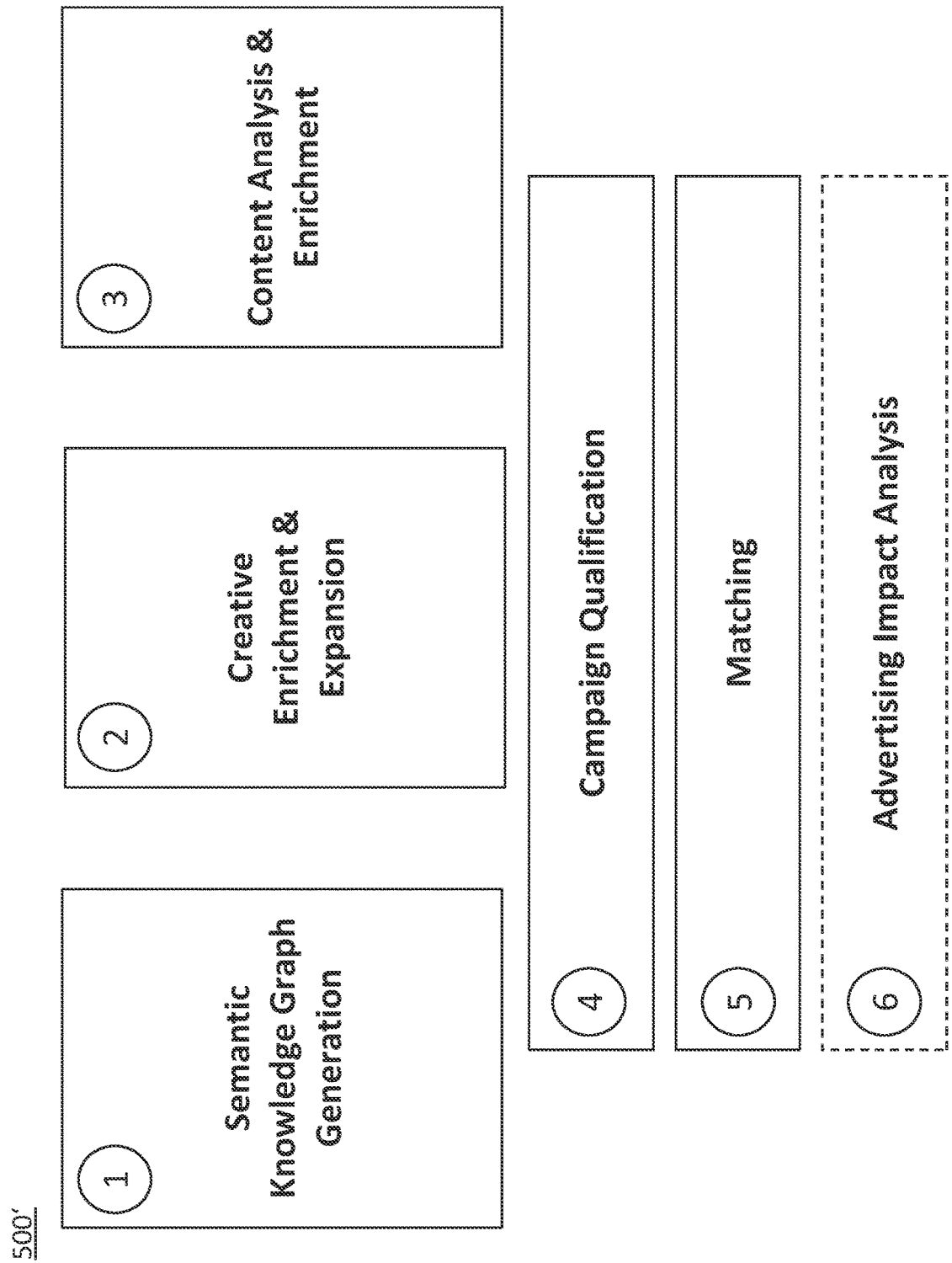
FIG. 6 is a block diagram schematically illustrating a system for facilitating online advertising with improved privacy.

FIG. 6 is a block diagram illustrating a system 500' for facilitating online advertising in a network with improved privacy. The system 501 is typically similar to the system 500 explained above with regard to FIG. 5. In particular, the system 501 typically includes as subsystem a server 501 as explained above with regard to FIG. 5 for performing the matching in block 5.

Furthermore, the system 500' typically includes as respective subsystems a server 100 as explained above with regard to FIG. 1 for generating (and maintaining) the semantic knowledge graph and the first database 70, respectively, as indicated by block 1, a server 200 for generating (and maintaining) the concept database 60 as indicated by block 2, and a server 300 for analysing the content of target (target analyzing system) and ads (campaign analyzing system) as indicated by block 3.

In particular, the system 500' may include:

a matching module configured to use weighted semantic target metadata for a target content (10') provided in the network and weighted semantic campaign metadata for an advertising campaign ($Ad_j$) to be presented in the network and referring to a respective product and/or a service to determine a matching parameter ($p_{ij}$) between the target content and the advertising campaign; and a management module (510) configured to use the matching parameter ($p_{ij}$) to decide if the advertising campaign ($Ad_j$) is to be provided to the target content (10').

Typically, the weighted semantic target metadata for the target content comprise weights for the concepts of the target content.

The weighted semantic campaign metadata may comprise weights for the concepts of the advertising campaign ($Ad_j$).

The matching module (520) is typically configured to determine the matching parameter $p_{ij}$ as a function of the weights for the concepts of the target content and the weights for the concepts of the advertising campaign.

Typically, the function depends on the products of the weights of common concepts of the target content and the advertising campaign (see eq. 1 above).

The system 500' typically includes a campaign database (80) storing semantic metadata for advertising campaigns (ads), and the matching module (520) has access to the campaign database (80).

Alternatively or in addition, the matching module may have access to a campaign analyzing system (300) which is configured to determine semantic metadata ($\{c_{Ai}, w_{ik} \ldots\}$) for advertising campaigns and/or to store the semantic metadata ($\{c_{Ai}, W_{ik} \ldots\}$) in a campaign database (80).

The campaign analyzing system typically includes:

a semantic analysis module (320) that is, when executed by the at least one of the one or more processors, configured to determine primary weighted semantic metadata for the advertising campaigns (Ad$_j$) using the campaign database (60) typically storing weights ({w$_{ikl}$}) for concepts (c$_{ik}$) within predefined segment categories (S$_1$); and a semantic expansion module (330) configured to determine secondary weighted semantic metadata for the advertising campaigns (Ad$_j$) using the first database (70) typically storing first concepts {c$_{ik}$}, first weights {w$_{ik}$} for the first concepts in predefined segment categories {S$_j$}, second concepts {r$_{ikm}$} that are related to the first concepts, and second weights ({w$_{ikm}$}) for the second concepts in the predefined segment categories {S$_j$}, and optionally identified ratings of the advertising campaigns (Ad$_j$).

The semantic campaign analysis module (320) and/or the semantic expansion module (320) may be configured to use additional content {AD$_j$} retrieved from the network for determining the respective weighted semantic metadata.

Further, the system 500' may include a target database (90) storing semantic metadata for target content (10, 10').

Alternatively or in addition, the system 500' may include a target analyzing system including:

a semantic analysis module configured to determine primary weighted semantic metadata for target content using the concept database (60);

a semantic expansion module configured to determine secondary weighted semantic metadata for the target content using the first database (70) storing first concepts ({c$_{ik}$}), first weights ({w$_{ik}$}) for the first concepts in predefined segment categories ({S$_j$}), and optionally identified ratings ({s$_i$})* of the target content; and a storage module (350) configured to store the respective weighted semantic metadata and optionally the identified ratings ({s$_i$}) of the target content in a target database (90).

The system 500' may include one or more servers (100, 200, 300, 400, 501) connected to the network and configured to initiate sending via the network an advertising campaign with a matching parameter {p$_{ij}$} above a predefined threshold to a client (1) having a display displaying the target content (10') and the advertising campaign.

The system 500' may be configured to initiate sending the advertising campaign at least substantially based on the matching parameter {p$_{ij}$}, at least substantially based on the matching parameter {p$_{ij}$}, and identified ratings ({s$_i$}) of the target content and/or the advertising campaign, and/or wherein the system is configured to initiate sending the advertising campaign without taking into account tracking data of registered users of the client (1).

In the exemplary embodiment of FIG. 6, the server 501 may additionally be configured to perform additional blocks or modules 4 referring to a campaign qualification and 6 referring to an impact analysis.

In a nutshell, the campaign qualification and the impact analysis may be implemented as variants of the matching explained above. The campaign qualification takes place in a campaign planning process. It makes a prediction over the whole addressable target content and makes recommendations where ads should be placed and where not. In combination with additional data about the number of users visiting the respective URLs the system can deliver a prediction how many qualified placements can be made. This information can also be utilized in programmatic ad bidding processes, to optimize the biddings to focus on those URLs which will have the best impact, less risk for bad placements and still reach the requested number of users. The Impact Analysis takes place in a continuous process during and after ad placement. It evaluates the actual click behaviour of the user (without tracking personal data) and checks whether the user actually clicks on a recommended ad. From this it can then be concluded how well the advertising message is received by the user, especially in connection with the concepts and emotions. The information can be used for adapting the weights and/or the matching functions. In addition this information is of interest to the advertiser in that it makes explicit in which emotions and topical surroundings users are open to a brand message.

Figure 7B:
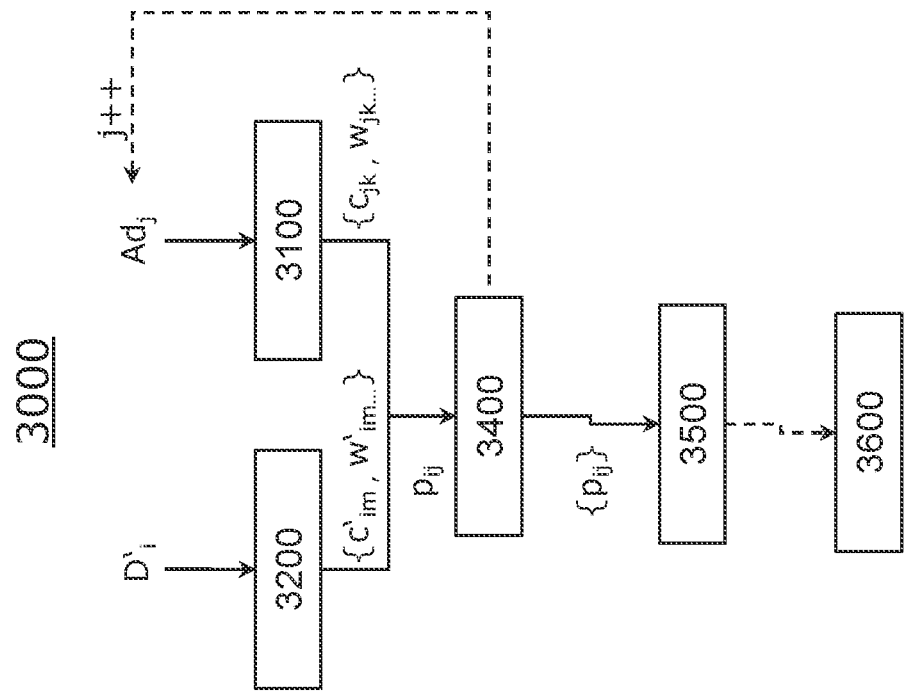
FIG. 7B illustrates a flow chart of a method for facilitating online advertising with improved privacy in a network to an embodiment.
Figure 7A:
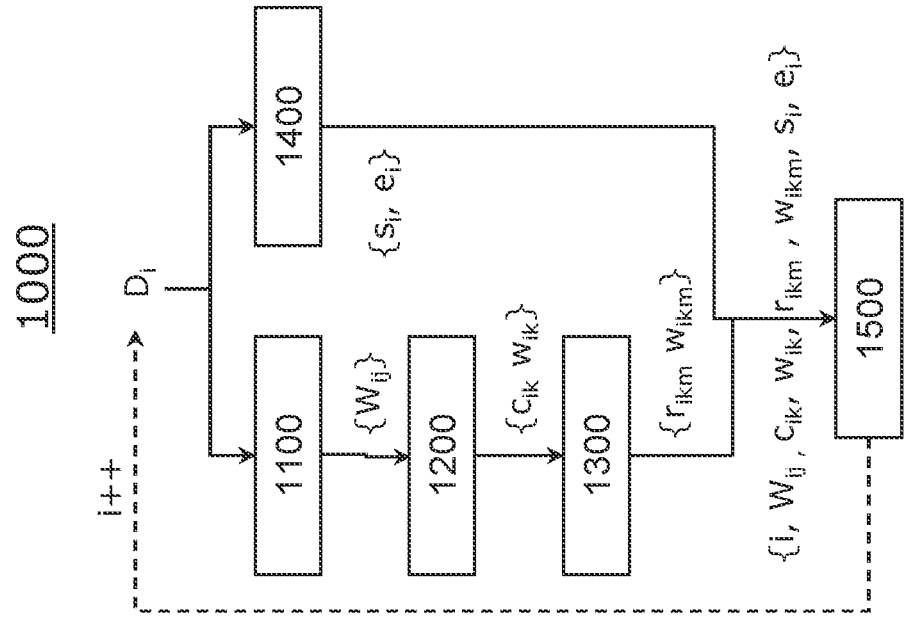
FIG. 7A illustrates a flow chart of a method for creating, updating and/or maintaining a database according to an embodiment.

FIG. 7A illustrates a flow chart of a method 1000 for creating, updating and/or maintaining the first database 80. Method 1000 may be used by the server 100 explained above with regard to FIG. 1.

After receiving a primary content D$_i$, primary weights {W$_{ij}$} referring to a respective correlation between the primary content D$_i$ and one segment category of several predefined segment categories S$_j$ are determined in a block 1100.

Further, a sentiment and/or an emotion {s$_i$, e$_i$} may be determined for the primary content D$_i$ in a block 1400.

In a subsequent block 1200, explicit concepts and implicit concepts {c$_{ik}$} may be identified in the primary content (D$_i$), and to determine first secondary weights ({w$_{ik}$}) characterizing embeddings of the identified concepts ({c$_{ik}$}) in the respective main segment category (S$_j$) with highest primary weight (Max{w$_{ij}$}, j)) using a concept database (60) storing weights ({w$_{ikl}$}) for concepts (c$_{ik}$) within the predefined segment categories (S$_1$).

Thereafter, respective related concepts ({r$_{ikm}$}) and second secondary weights ({w$_{ikm}$}) of the related concepts ({r$_{ikm}$}) characterizing embeddings of the related concepts ({r$_{ikm}$}) in predefined segment categories (S$_j$) may be determined for the identified concepts ({c$_{ik}$}).

The identified concepts ({c$_{ik}$}), the first secondary weights ({w$_{ik}$}), the related concepts ({r$_{ikm}$}), the second secondary weights ({w$_{ikm}$}), and any sentiment and/or an emotion may be stored in the first database (70), in a block 1500.

As indicated by the dashed arrow in FIG. 7A, the index i may be incremented and a further a primary content D$_i$ processed.

FIG. 7B illustrates a flow chart of a method 3000 for facilitating online advertising with improved privacy in a network. Method 3000 may be used by the server 501 explained above with regard to FIG. 5.

In blocks 3100, 3200 respective weighted semantic target metadata, are provided for an advertising campaign Ad$_j$ and a target content D'$_i$.

The weighted semantic target metadata include respective concepts c$_{jk}$, c'$_{im}$ and corresponding weights (typically real numbers) w$_{jk}$, w'$_{im}$ of the concepts c$_{jk}$, c'$_{im}$.

In a block 3400, the weighted semantic target metadata {c'$_{im}$, w'$_{im}$ . . . } of the target content D'$_i$ and the weighted semantic target metadata {c$_{jk}$, w$_{jk}$ . . . } are used to calculate a matching parameter p$_{ij}$ between the target content D'$_i$ and the advertising campaign Ad$_j$ as explained above with regard to FIG. 5.

As indicated by the dashed arrow in FIG. 7B, the index j may be incremented and a further matching parameters p$_{ij}$ between the target content D'$_i$ and a further advertising campaign Ad$_j$ calculated.

In a block 3500, the matching parameters p$_{ij}$ are used for ranging the advertising campaigns Ad$_j$ with respect to the target content D'$_i$.

Finally, the highest ranked advertising campaign(s) Ad$_j$ may be provided to a client displaying the target content D'$_i$ in a block 3600.

According to an embodiment of a system for creating and/or maintaining a database, the system includes a classification module configured to determine primary weights for a primary data (stream), each primary weight referring to a correlation between a content of one of the primary data and one segment category of several predefined segment categories, and to determine a segment category with highest primary weight as a main segment category; a recognition module configured to identify explicit concepts and implicit concepts in the content of the primary data streams, and to determine first secondary weights characterizing embeddings of the identified explicit concepts and implicit concepts in the main segment category using a concept database storing concepts and respective concept metadata including weights of the concepts within the predefined segment categories and/or relations between concepts within the predefined segment categories, and an expansion module configured to determine for the identified (explicit and implicit) concepts respective related (explicit and implicit) concepts and second secondary weights of the related concepts, the secondary weights characterizing embeddings of the related concepts in at least one of the predefined segment categories.

The system typically includes an analysis module configured to identify in the primary data streams a rating comprising at least one of a sentiment and an emotion.

Further, the system typically includes a storage module configured to save the identified concepts, the first secondary weights, the related concepts, the second secondary weights, and optionally the identified rating in the first database.

According to an embodiment of a system for facilitating online advertising with improved privacy in a network, the system includes a matching module configured to use weighted semantic target metadata for a target content provided in the network and weighted semantic campaign metadata for an advertising campaign to be presented in the network and referring to a respective product and/or a service to determine a matching parameter between the target content and the advertising campaign, and a management module configured to use the matching parameter for ranking of advertising campaigns with respect to the target content and/or deciding if the advertising campaign is to be provided to the target content.

According to an embodiment of computer-implemented method for facilitating online advertising with improved privacy in a network, the method includes semantically analyzing an advertising campaign to be presented in the network and referring to a respective product and/or a service to determine for the advertising campaign weighted semantic campaign metadata including a concept of the advertising campaign and a respective weight of the concept in at least one segment category of several predefined segment categories; semantically analyzing a target content, in particular a webpage, provided in the network to determine weighted semantic target metadata comprising a concept of the target content and a respective weight of the concept of the target content in at least one segment category of the several predefined segment categories; using the weighted semantic target metadata and the weighted semantic campaign metadata to determine a matching parameter between the target content and the advertising campaign; and using the matching parameter to decide if the target content is to be linked with the advertising campaign and/or if the advertising campaign is to be provided when the target content is retrieved on request of a client connected to the network.

Typically, at least one of the concept of the advertising campaign and the concept of the target content is an implicit concept.

The systems, devices and methods explained herein do not require recording, storing and processing of any kind of personal data and are therefore is compliant by design with privacy requirements such as the principles of the GDPR regulation and the like as well as the forthcoming e-Privacy regulation. In particular, user tracking can be completely avoided.

Instead, various techniques of natural language processing including CNNs and/or deep neural networks are used to predict those ads that will have the most positive impact on a user's willingness to click on the ad, depending on the context the ad is embedded in.

Context-sensitive algorithm as explained herein may be used to subtly map out the different meanings of individual words in various contexts (like for instance "attack" in the context of sports or warfare) and related implications on the user's perception.

Further, the algorithm may be sensitive to the changing relevance of topics and related words people assign to them and/or to the changing emotional implications and moods certain topics and words may cause to the user consuming content and an embedded ad, depending on time and context. Note that sentiments are typically not static but may depend on context, time and/or segment category (field).

In particular, a distributed computing architecture that analyses the different realms of information may be used. The first realm includes all content assets, like webpages, that are possibly the target where an ad is to be embedded in. The second realm includes all information regarding the campaign, including the ad description, the landing page of the campaign and optionally additional information related to the campaign or the advertised offering or company. The third realm includes all kind of publicly available information in the WWW like news, online magazines, and blogs as well as social media and user forums.

The explained processes for facilitating online advertising with improved privacy, as well as creating and/or maintaining databases can practically not be performed by humans (human mind) but may outperform humans with respect to quality of ad placement.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Such modifications to the inventive concept are intended to be covered by the appended claims.

While processes may be depicted in the figures in a particular order, this should not be understood as requiring, if not stated otherwise, that such operations have to be performed in the particular order shown or in sequential order to achieve the desirable results. In certain circumstances, multitasking and/or parallel processing may be advantageous.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A system for creating and/or maintaining at least a first database, the system comprising:
   one or more processors;
   a classification module that is, when executed by at least one of the one or more processors, configured to determine primary weights for primary data streams representing text, each primary weight referring to a correlation between one of the primary data streams and one segment category of several predefined segment categories;
   a recognition module that is, when executed by at least one of the one or more processors, configured to identify explicit concepts and implicit concepts in the primary data streams, and to determine first secondary weights characterizing embeddings of the identified concepts in the respective main segment category with highest primary weight using a concept database storing weights for concepts within the predefined segment categories;
   an expansion module that is, when executed by at least one of the one or more processors, configured to determine for the identified concepts respective related concepts and second secondary weights of the related concepts characterizing embeddings of the related concepts in at least one of the predefined segment categories; and
   a storage module that is, when executed by at least one of the one or more processors, configured to save the identified concepts, the first secondary weights, the related concepts, and the second secondary weights in the first database.

2. The system of claim 1, further comprising
   an analysis module that is, when executed by at least one of the one or more processors, configured to identify in the primary data streams a rating comprising at least one of a sentiment, and an emotion,
   wherein the storage module is configured to save the identified rating in the first database.

3. The system of claim 2, wherein the analysis module is based on a trained CNN.

4. The system of claim 2, wherein the analysis module is restricted to a sentiment analysis.

5. The system of claim 4, wherein the sentiment analysis scores the content to be positive or negative on a continuous scale between +1 and −1.

6. The system of claim 1, wherein the recognition module comprises at least one of:
   a linguistic analysis module that is, when executed by at least one of the one or more processors, configured to determine for the primary data streams a respective normalized set of keywords; and
   a concept enrichment module that is, when executed by at least one of the one or more processors, configured to identify the explicit concepts, the implicit concepts, and the first and second secondary weights using the concept database.

7. The system of claim 6, wherein the concept enrichment module is configured to assign a respective individual weight to each implicit or explicit concept.

8. The system of claim 6, wherein the concept enrichment module is configured to access to a second database to identify concepts in the primary data streams which are not explicitly included in the primary data streams.

9. The system of claim 8, wherein the system is configured to create and/or maintain the second database.

10. The system of claim 8, wherein the system comprises:
    a learning module that is, when executed by at least one of the one or more processors, configured to determine for known concepts comprising a respective term found in the primary data streams embedding terms for the respective term and weights characterizing the embeddings of the embedding terms in the respective segment categories,
    wherein the storage module is configured to update the known concepts stored in the second database in accordance with the embedding terms and the weights.

11. The system of claim 10, wherein the learning module comprises a deep learning module which is based on a neural network.

12. The system of claim 10, wherein the learning module implements a word embedding algorithm for determining the weights characterizing the embeddings of the embedding terms.

13. The system of claim 10, wherein the learning module comprises:
    an embedding module that is, when executed by at least one of the one or more processors, configured to determine the weights characterizing the embeddings of the embedding terms.

14. The system of claim 1, wherein the system is configured to host the first database and/or wherein the storage module is configured to save the identified concepts, the first secondary weights, the related concepts, the second secondary weights, and/or the identified rating in a semantic knowledge graph structure of the first database.

15. The system of claim 14, wherein the storage module is configured to save the identified concepts, the first secondary weights, the related concepts, the second secondary weights, and the identified rating in the semantic knowledge graph structure of the first database.

16. The system of claim 14, wherein the system is configured to update the semantic knowledge graph.

17. The system of claim 1, wherein the classification module comprises a trained CNN.

* * * * *